United States Patent
Abu Freh

(10) Patent No.: US 12,356,024 B2
(45) Date of Patent: Jul. 8, 2025

(54) SYSTEM AND METHOD FOR STREAMING VIDEO IN REAL-TIME VIA VIRTUAL REALITY HEADSET USING A CAMERA NETWORK

(71) Applicant: Ismael Abu Freh, Rahat (IL)

(72) Inventor: Ismael Abu Freh, Rahat (IL)

(*) Notice: Subject to any disclaimer, the term of this patent is extended or adjusted under 35 U.S.C. 154(b) by 0 days.

(21) Appl. No.: 18/842,063

(22) PCT Filed: Aug. 28, 2023

(86) PCT No.: PCT/IL2023/050911
§ 371 (c)(1),
(2) Date: Aug. 28, 2024

(87) PCT Pub. No.: WO2024/047634
PCT Pub. Date: Mar. 7, 2024

(65) Prior Publication Data
US 2025/0113066 A1    Apr. 3, 2025

(30) Foreign Application Priority Data
Aug. 29, 2022   (IL) .......................................... 296044

(51) Int. Cl.
*H04N 21/218*    (2011.01)
*G02B 27/01*    (2006.01)
(Continued)

(52) U.S. Cl.
CPC ..... *H04N 21/21805* (2013.01); *G02B 27/017* (2013.01); *G06N 3/02* (2013.01);
(Continued)

(58) Field of Classification Search
CPC ........... H04N 21/21805; H04N 13/332; H04N 21/2187; H04N 21/23418; G02B 27/017; G06N 3/02
See application file for complete search history.

(56) References Cited

U.S. PATENT DOCUMENTS

| 12,184,929 B2 * | 12/2024 | Kalathuru | .......... H04N 21/4622 |
| 2003/0204630 A1 * | 10/2003 | Ng | ..................... H04N 21/2665 |
| | | | 348/E7.063 |

(Continued)

FOREIGN PATENT DOCUMENTS

| WO | WO 2021/111310 A1 | 6/2021 | |
| WO | WO-2023044420 A1 * | 3/2023 | ......... H04N 21/2187 |

OTHER PUBLICATIONS

International Search Report received in corresponding Application No. PCT/IL2023/050911, dated Nov. 29, 2023, 5 pages.

*Primary Examiner* — John R Schnurr
(74) *Attorney, Agent, or Firm* — Dority & Manning, P.A.

(57) ABSTRACT

The invention disclosed herein offers a system that allows users to virtually navigate between multiple, simultaneous live events occurring in disparate geographic locations. The system organizes a network of cameras into distinct groups, each tasked with capturing video streams of a specific event at a unique venue, such as a sports stadium. These video streams are captured from various angles, providing a multi-dimensional viewing experience. Users have the flexibility to manually or automatically switch between these events, thereby crafting a unique and personalized viewing experience.

13 Claims, 9 Drawing Sheets

(51) Int. Cl.
*G06N 3/02* (2006.01)
*H04N 13/332* (2018.01)
*H04N 21/2187* (2011.01)
*H04N 21/234* (2011.01)

(52) U.S. Cl.
CPC ....... *H04N 13/332* (2018.05); *H04N 21/2187* (2013.01); *H04N 21/23418* (2013.01)

(56) References Cited

U.S. PATENT DOCUMENTS

| | | | |
|---|---|---|---|
| 2013/0169869 A1* | 7/2013 | Demoulin | H04N 21/4722 348/515 |
| 2015/0334442 A1* | 11/2015 | Charania | H04N 21/4821 725/44 |
| 2016/0337710 A1* | 11/2016 | Badaan | G06Q 30/0269 |
| 2016/0381408 A1* | 12/2016 | Triano | H04N 21/8549 725/10 |
| 2017/0264936 A1* | 9/2017 | Depies | G02B 27/0093 |
| 2018/0077437 A1 | 3/2018 | Hansen et al. | |
| 2018/0376217 A1 | 12/2018 | Kahng et al. | |
| 2020/0236278 A1 | 7/2020 | Yeung et al. | |
| 2021/0152808 A1* | 5/2021 | He | H04N 21/816 |
| 2021/0319587 A1* | 10/2021 | Sha | G06V 30/274 |
| 2021/0352337 A1 | 11/2021 | Bustamante et al. | |
| 2022/0309279 A1* | 9/2022 | Biswas | G06V 20/49 |
| 2023/0007333 A1* | 1/2023 | Bancs | H04N 21/2743 |
| 2023/0088988 A1* | 3/2023 | Krishnamoorthi | H04N 21/4316 725/46 |
| 2023/0093416 A1* | 3/2023 | Kumar | H04N 5/45 725/18 |
| 2023/0137066 A1* | 5/2023 | Mendell | H04N 21/25808 725/144 |
| 2023/0319251 A1* | 10/2023 | He | H04N 21/2353 348/39 |
| 2023/0370664 A1* | 11/2023 | Verma | H04N 21/251 |
| 2023/0396826 A1* | 12/2023 | Apurvi | H04N 21/2187 |
| 2024/0040067 A1* | 2/2024 | Apurvi | H04N 21/2187 |
| 2024/0334001 A1* | 10/2024 | Porter | H04N 21/23418 |

\* cited by examiner

SYSTEM AND METHOD FOR STREAMING VIDEO IN REAL-TIME VIA VIRTUAL REALITY HEADSET USING A CAMERA NETWORK

CROSS-REFERENCE TO RELATED APPLICATIONS

This application is the U.S. National Stage entry of International Application No. PCT/IL2023/050911, filed on Aug. 28, 2023, which, in turn, claims priority to Israeli Patent Application No. 296044, filed on Aug. 29, 2022, both of which are hereby incorporated herein by reference in their entireties for all purposes.

FIELD OF THE INVENTION

The present invention relates to the field of real-time video streaming systems. More particularly, the invention relates to a method and system for streaming video in real-time by utilizing virtual reality technology in combination with a camera network, working together to provide a feeling of presence at a particular time in a specific place, e.g., being present in a specific sports event while being able, manually or automatically, to change locations in a specific sports event or between the different live events in accordance with user preferences and/or the development of each sport event, while separating between visual data and audible data of each given camera included in the camera network.

BACKGROUND OF THE INVENTION

There are a lot of people who could not present at specific events (e.g., sports games, rock concerts, or other live events) that they wish to attend due to many reasons. For example, due to geographic limitations (e.g., being in other countries, cities, etc.), lack of transportation, health conditions, financial/budget limitations, or simply because they don't have an opportunity to participate due to a limited number of tickets or restrictions of the host location. People often use TV to watch desired events in real-time, but with all their desire, they cannot replace the same feeling and excitement of being at the event. For example, soccer fans almost never miss an important match but do not always have an opportunity to be physically present in the stadium.

The number of locations for the desired events is obviously limited, and people often need to make reservations in advance. Moreover, if the event is in a relatively distant geographic location (e.g., country, city), one needs to plan a complete journey, such as taking a day off if required, arranging suitable transportation, booking a hotel, etc. As a result, it may become costly to participate in the desired event.

Unfortunately, it is well known that many sports teams worldwide have millions of fans, and the stadium's capacity (where matches usually occur) is not equal to the number of fans. As a result, many sports fans remain with the option to watch the game on locally available devices (e.g., TV, smartphones, tablets, or via any other piece of equipment suitable for such a purpose). Still, it will never replace being in the stadium, feeling all the atmosphere, seeing players close, and celebrating with other fans that are physically present at the event.

Health conditions and age are one of the reasons for people not being able to attend a football match. Due to limited mobility, immobility, or other health conditions, people often give up on going to the stadium and watching the game, as their health condition restricts them from their usual activities. It is just one example that shows the importance of the invention. Of course, there are many more reasons why people could not physically attend the stadium, such as limited capacity, relatively high expenses, physical distance, etc.

It is known that through the camera, many events can be streamed and watched in real-time on TV. It is also known that people may use virtual reality (VR) equipment (e.g., a VR headset) for an immersive 3D experience. Yet, in the prior art, no known solution is provided that can put a person in a position of full presence in a real-time event with a wide range of feelings that can convey a real sense of attending the events, including the use of the potential of Artificial Intelligence and a camera network.

Many people worldwide have no time and opportunities to visit other countries due to work, country restrictions, phobias to using aircraft or other kinds of transportation, do not want to travel alone, budget, and many other circumstances.

Therefore, an enhanced VR-based solution is required to address these problems and allow people to expand their experience while watching a live event, that will enable users to jump from one location to another, travel around the world, and attend multiple live events that may take place at different locations, etc., in the comfort of their own homes or current physical location It is an object of the present invention to provide a system capable of managing a network of cameras to combine visual and hearing parts that convey feelings as natural as physically being in live events.

Other objects and advantages of the invention will become apparent as the description proceeds.

SUMMARY OF THE INVENTION

The present invention provides a system that enables users to virtually travel between multiple distinct live events or activities that are happening at the same time, but in different places. To enable such a virtually travel between distinct live events, the system of the present invention divides the camera network into groups of cameras, each group directed to stream videos of a distinct event that occur at a specific venue or geographic location, such as a specific sports stadium, and to provide video streams from different angles at each specific location. This allows users manually or automatically to switch between events that may occur simultaneously at different geographic locations, creating a unique and customizable viewing experience.

In one aspect, the present invention relates to a method of streaming video in real-time via a virtual reality (VR) headset using a camera network, comprising:
  receiving real-time video streams from a plurality of cameras from one or more live events;
  processing the received video streams by applying artificial intelligence (AI) and computer vision algorithms to obtain a plurality of viewing angles of VR video streams for each specific event while separating between visual data and audible data of each viewing angle; and
  streaming the processed video streams according to each user's preferences and enabling each user to switch between live event's cameras, viewing angles, and streams of audible data.

In one aspect, the AI algorithms are selected from the group consisting of: machine learning (ML), deep learning, neural networks, or any combination thereof.

In another aspect, applying the AI and computer vision algorithms are used to process captured streaming data and gain insights in order to detect situations/actions of interest that occur during the live event.

In another aspect, applying the AI and computer vision algorithms are used to predict a situation that can be developed during the live event and/or to predict from which camera said situation could be best viewed.

In another aspect, applying the AI and computer vision algorithms are used to learn the viewing preferences of each specific user and accordingly suggest the best viewing angle or automatically switch to the viewing angle.

In another aspect, the method further comprises enabling users to switch between cameras located at different geographic locations, wherein each geographic location is associated with a different event.

In yet another aspect, the present invention relates to a system for streaming video in real-time via virtual reality (VR) headset using a camera network, comprising:

A plurality of VR cameras, each of which is suitable to provide a different viewing angle of live events;

a VR streaming server configured to receive video streams from different locations (live events) from the plurality of VR cameras and to process the received video streams by applying artificial intelligence (AI) and computer vision algorithms to obtain a plurality of viewing angles of VR video streams for said live event; and one or more VR headsets, each of which is adapted to enable viewing processed video streams and switching between cameras, different viewing angles, different live events, and audible data, either automatically or upon demand by a user.

In another aspect, at least some of the cameras are adapted to be carried by moveable objects, including selected persons (e.g., football players, referees, etc.) and portable equipment (e.g., football balls, players' shoes, etc.).

In yet another aspect, the present invention relates to a digital streaming system designed for simultaneous multi-event coverage, comprising:

AI modules specifically tailored for real-time analysis of streaming data from multiple events to identify or predict moments of interest in each event;

Computer vision algorithms that work in tandem with the AI modules to differentiate and prioritize moments from diverse events;

A network of cameras positioned at various events, integrated into the system to provide diverse viewing perspectives and facilitate the selection of optimal viewing angles based on the AI's analysis.

In one aspect, the AI modules utilize machine learning, deep learning, and neural networks to differentiate between events and enhance the streaming experience by offering real-time AI analytics for automation, prediction, and personalization of viewing angles across multiple events.

In one aspect, the AI modules can learn a user's viewing preferences for multiple events over time and autonomously adjust the streaming angle based on these preferences.

In one aspect, the system can split the audio from one event's streaming source and synchronize it with the video from another event, allowing users to customize their multi-event viewing and listening experiences.

In one aspect, a user can visually engage in one live event while audibly immersing in a different live event.

In another aspect, users are given the unparalleled flexibility to customize their auditory experience by combining multiple audio streams. This means that a user can select the ambient sound from a preferred camera angle at one event, overlay it with commentary from a broadcaster in a language of their choice, and simultaneously maintain an open audio channel to converse with friends or other users. This multi-layered audio experience can be seamlessly integrated with the video stream of a different live event, offering a truly unique and immersive multi-sensory experience.

In one aspect, the system further comprises a Virtual Reality (VR) integration module designed to create a shared virtual space where users can experience events together through generated avatars that closely resemble their real-world appearance and actions.

In one aspect, the VR integration module captures real-time data from users, including facial features, body movements, and objects held, to generate and animate the avatars in the shared virtual space.

In one aspect, the shared virtual space is rendered to represent real-world venues, and avatars can interact, communicate, and share reactions to live events, enhancing the collective viewing experience.

In one aspect, the AI modules further analyze user interactions within the shared virtual space to optimize avatar movements, suggest interactive activities, and enhance the shared viewing experience based on collective user preferences.

In another aspect, the present invention relates to a method for enhancing the multi-event streaming experience, comprising the steps of analyzing streaming data from multiple events using AI modules, computer vision algorithms, and a network of cameras; differentiating and predicting moments of interest in each event; and autonomously adjusting the streaming angle based on user preferences.

In one aspect, the method further comprises the step of splitting the audio from one event's streaming source and synchronizing it with the video from another event.

In one aspect, the AI modules harness machine learning, deep learning, and neural networks to differentiate between events and enhance the streaming experience.

In one aspect, the network of cameras provides diverse viewing angles and perspectives for each event, enhancing the depth and breadth of the multi-event streaming experience.

In one aspect, the method further comprises providing a shared multi-event streaming experience, comprising the steps of capturing real-time data from users through a VR device, generating avatars that resemble users in appearance and actions, placing the avatars in a shared virtual space, and allowing avatars to interact and share reactions to live events.

In one aspect, the method further comprises the step of using AI modules to analyze user interactions within the shared virtual space, optimizing avatar movements, suggesting interactive activities, and enhancing the shared viewing experience. In one embodiment of the invention, users have the option to select an avatar that resembles a public figure, such as a renowned actor or professional football player, thereby enhancing the sense of immersion and social interaction within the multi-event journey. It should be noted that prior to making such avatars available for shared experiences with users, all necessary rights and permissions will be obtained from the individual whose likeness is to be used for the avatar.

In one aspect, the shared virtual space is rendered to represent real-world venues, and avatars can choose vantage points, move around, and communicate with other avatars, mirroring the actions of the users they represent.

In one aspect, the AI-driven components of the system ensure that the shared viewing experience is not only realistic but also tailored to each user's preferences, offering a truly personalized and collective viewing experience.

DETAILED DESCRIPTION OF THE INVENTION

Figure 1:
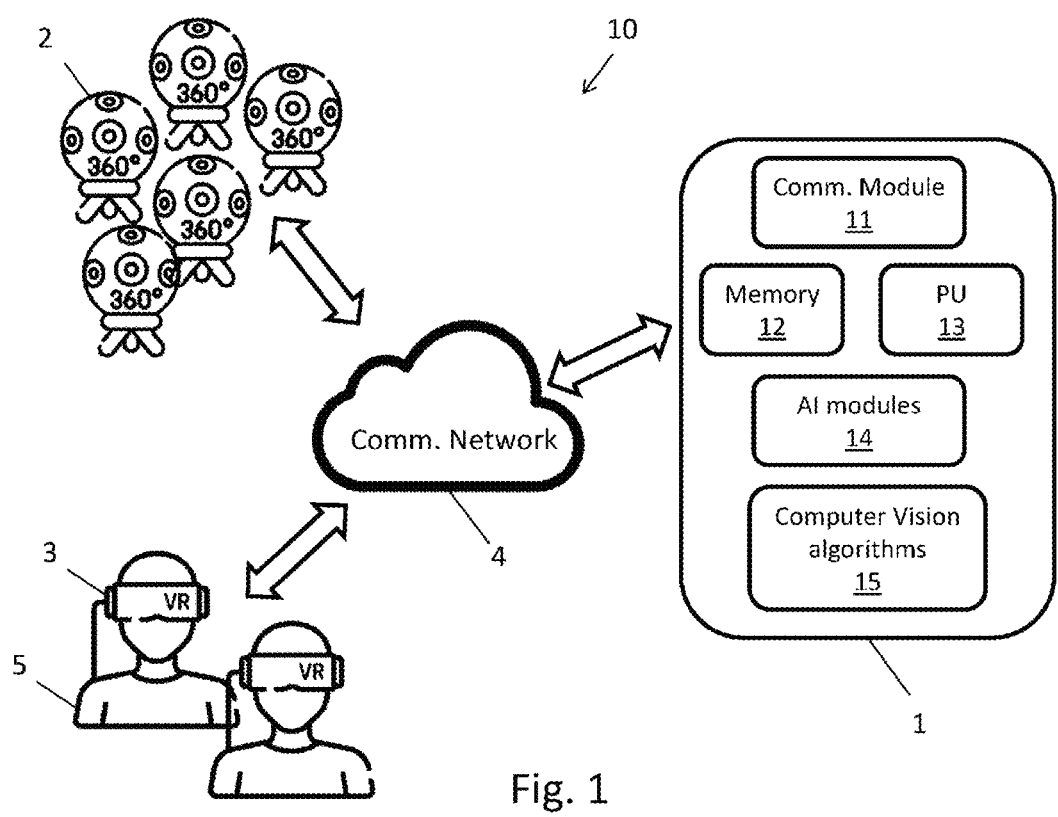
FIG. 1 schematically illustrates a system for streaming video in real-time via a VR headset using a camera network, according to an embodiment of the invention.

Various terms are used throughout the description and the claims, which should have conventional meanings to those with a proper understanding of computer systems and programming. Additionally, various descriptive terms are used in describing the exemplary embodiments to facilitate an explanation of them and aid one's understanding. However, while the description to follow may entail terminology which is perhaps tailored to specific computing or programming environments, such as cloud-based computer systems and servers, or the various embodiments themselves, it will be appreciated by a person skilled in the art that such terminology is employed in a descriptive sense and not a limiting sense. Where a confined meaning of a term is intended, it will be explicitly set forth or otherwise apparent from the disclosure.

The present invention relates to a digital streaming system designed for simultaneous multi-event coverage. The system integrates advanced AI modules, computer vision algorithms, and a network of cameras to provide a unique and enhanced streaming experience that differentiates and prioritizes moments from diverse events. According one embodiment, the present invention provides a system and method for live streaming events by utilizing virtual reality (VR) equipment that includes a head-worn apparatus for an immersive 3D experience (e.g., a VR headset and the like). According to an embodiment of the invention, the system uses computer vision techniques and algorithms that may involve machine learning (ML) and Artificial Intelligent (AI) technologies to detect situations/actions of interest that may occur during a live event. For example, in soccer/football, detecting a situation where one team transitions from defense to attack in an attempt to score a goal.

Reference will now be made to several embodiments of the present invention, examples of which are illustrated in the accompanying figures for purposes of illustration only. One skilled in the art will readily recognize from the following description that alternative embodiments of the structures and methods illustrated herein may be employed without departing from the principles of the claimed invention. Moreover, for the sake of brevity, the following description refers mostly to events such as soccer/football matches, but is not meant to limit the invention to this type of event, and the invention can be applied to any kind of event that can be streamed in real-time, such as concerts, other kinds of sports-based contests, nature, different kinds of tours, or other places that allowed live streaming.

The following discussion is intended to provide a brief, general description of a suitable computing environment in which the invention may be implemented. While the invention will be described in the general context of program modules or codes that execute in conjunction with one or more application programs that run on an operating system on a computer system, those skilled in the art will recognize that the invention may also be implemented in combination with other computer systems. The functions described herein may be performed by executable code and instructions stored in a computer-readable medium and running on one or more processor-based systems. Embodiments of the invention may be implemented as a computer process, e.g., a computer system that encodes a computer program of instructions for executing the computer process.

FIG. 1 schematically illustrates a system 10 for streaming video in real-time via a VR headset using a camera network, according to an embodiment of the invention. System 10 comprises a VR streaming server 1, a plurality of VR cameras 2, and a VR headset 3. Server 1, cameras 2, and VR headsets 3 can be linked through a communications network 4 (e.g., via the Internet). Server 1 is configured to receive real-time video streams simultaneously from the plurality of VR cameras 2, located in different geographical locations, wherein at least one part of a group of VR cameras 2 that are located in a specific site (e.g., a football stadium) may simultaneously provide video streams to server 1 from different field-of-views (FOVs) or different locations. Server 1 processes the received video streams from the plurality of VR cameras 2, and accordingly generates data suitable to be streamed to VR headsets 3 (e.g., 360-degree video content). For example, VR camera 2 can be an omnidirectional camera (also known as a 360-degree camera) or other forms of a camera having a FOV that covers approximately the entire sphere or at least a full circle in the horizontal plane.

The system described allows for real-time video streaming to VR headsets. This is achieved by using multiple VR cameras placed in various locations, which send their video feeds to a central server. This server then processes these feeds and sends them to the VR headsets. An example provided is football stadiums where multiple cameras can offer different views of the games, and these views can be accessed in real-time by users wearing VR headsets.

According to an embodiment of the invention, in addition to common elements, such as communication module 11, memory 12, and processing unit (PU) 13, server 1 may further comprise one or more of the following modules: AI modules 14, computer vision algorithms 15 or a combination of both modules. The combination of AI modules 14 and computer vision algorithms 15 can be used to process captured streaming data and gain insights in order to detect situations/actions of interest that may occur during a live event streamed by VR cameras 2, or to predict a situation that may be developed during the live event (e.g., an attack of one team that has a high probability that it will end with scoring a goal) and from which VR cameras 2 such a situation can be best viewed by a user 5 wearing VR headset 3 (e.g., according to user 5 preference). According to some embodiment of the invention, AI module 14 and ML module 15 can be used to learn user 5 preferences (e.g., preferred viewing angle, location among the audience, or events, etc.) and accordingly suggest the best viewing angle to the user to choose from, or system 10 may automatically change viewing angle that is streamed to VR headset 3 of user 5.

The server is equipped with advanced AI and computer vision capabilities. These technologies allow the system to analyze the video streams in real-time and identify key moments or actions during a live event. For instance, in a football match, the system can predict when a goal might be scored based on the ongoing play. It can then suggest or automatically switch to the best camera angle for the user to view this action. Additionally, the system can learn from the user's viewing habits and preferences, ensuring a personalized viewing experience.

According to an embodiment of the invention, the implementation of AI modules 14 may involve machine learning (ML), deep learning, neural networks, or any other suitable AI algorithms. AI modules 14 can be utilized to improve video streaming with real-time AI analytics for automation, prediction, and control of viewing preferences. For example, users will be able to choose to stream on an automatic mode that will give them an opportunity to watch the game from the best angle and gain the most preferred view, depending on the preferences of each specific user. The application of computer vision algorithms 15 and AI modules 14 on the streaming may result in focusing/viewing any desired object or situation associated with the event. For example, in a football game, it may enable to focus on a ball, player, or any other game member/object, on specific moves that occurred in the game, or on any other item, object, or a person of interest. By applying AI algorithms on the received video streams provided from VR cameras 2, the AI modules 14 may work effectively by analyzing huge amounts of data and accordingly giving the best outcomes in terms of the preferences of each user, thereby giving a more exited experience for each user.

The AI modules in the system are versatile and can be based on various AI techniques such as machine learning, deep learning, and neural networks. These modules enhance the streaming experience by analyzing the video content in real-time and making intelligent decisions based on the analysis. For instance, during a football match, the system can focus on key players, the ball, or other significant events, ensuring that viewers get the most engaging experience. The AI's ability to process vast amounts of data quickly ensures that automatic mode. In the automatic mode, the system uses AI and machine learning algorithms to predict the best angles, events, or moments the user might be interested in, based on their past behavior and preferences. For instance, if a user frequently watches football matches and shows interest in close-up shots of goals, the system might automatically switch to a camera angle that provides a close-up view when a goal is about to be scored. On the other hand, in manual mode, users have full control over which camera angles they want to view, which events they want to switch between, and how they want to experience the live stream.

According to an embodiment of the invention, system 10 enables users to switch between VR cameras 2 at the same event (i.e., viewing the event from different angles). For example, such a capability allows users to choose the viewing angle and side from which they want to watch a football game, so it will make it possible for a specific user (e.g., user 5) to be in one place and next moment user 5 "teleports" to another location. For example, when teams switch the game side, fans can switch between the VR cameras 2 and continue watching the game from the side of their favorite team. According to some embodiments of the invention, this function of switching between VR cameras 2 is not limited just to a specific event site. Users can switch between VR cameras 2 placed at different event sites (e.g., two sports events that simultaneously occur at different geographic sites, one occurs in a first city, and the other one occurs in a second city). For example, football fans have two games that have played simultaneously in different countries or cities, so users can switch between the cameras placed in different stadiums. Hence, the user can watch one game and, in the next second, switch to watch the other one.

According to an embodiment of the invention, VR cameras 2 can be placed in any possible location (either a fixed location or portable) at the event site. For example, a VR camera 2 can be installed on selected persons or objects associated with the event, such as players, referees, football balls, posts, chairs, or any other suitable objects/locations, etc., that will allow capturing important angles, moments and views during the event.

According to an embodiment of the invention, system 10 enables one to watch recorded video streams that will give the opportunity to dive into the atmosphere of past events with a feeling that it is happening right now and watch favorite moments. Leveraging the power of AI, users can choose an option to review just the most important set of scenes that happened during the game. Viewing recorded video streams may convey a feeling of the full presence as natural as being there. For example, football fans will be able to experience again and again the atmosphere in the stadium fully and see and hear other fans among the audience, as well as players, just like they are among them.

According to an embodiment of the invention, users would be able to control the sound: to make the sound lower or higher, add a broadcaster, switch between languages, listen to music or switch to another audio channel (any other events, games, etc.) and choose to hear the background cheers of ultras fans even when they 'move' to watch another angle. For example, system 10 enables the separation of vision and hearing, allowing a user to simultaneously be present in two different locations in the stadium. From a first location, they can hear the local sound, and from the second location, they can view the event. Adding to this, the user has the unique ability to select not only one audio stream from any camera, including those on the network (e.g., at different events), but also add a broadcaster with preferred languages. Furthermore, users can engage in real-time conversations with friends or other users, enhancing the interactive experience. Such a feature will enrich the user experience and will make it even more unique.

According to some embodiments of the invention, system 10 may stream video to non-VR equipment, such as TV, smartphones, tablets, etc.

According to some embodiment of the invention, VR headset 3 or other user devices (e.g., a smartphone) can be used to enable a user to interact with system 10 via any suitable user interface (UI) means, such as a dedicated smartphone application (e.g., to control viewing preferences, capture an image while watching the event, control a recorded stream, etc.).

Figure 2A:
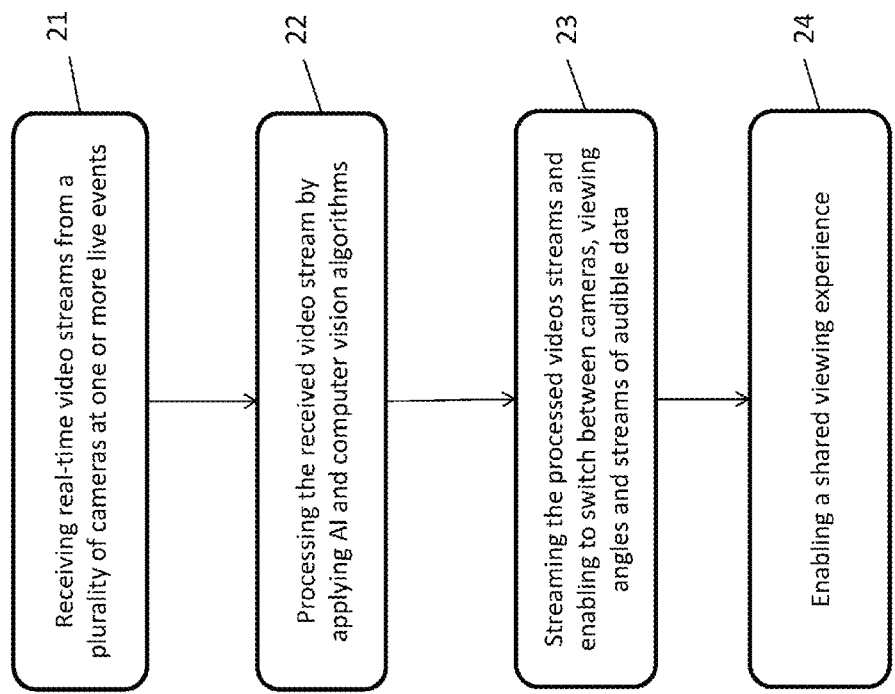
FIG. 2A is a flowchart illustrating the method of streaming video in real-time via a VR headset using a camera network, according to an embodiment of the invention.

FIG. 2A is a flowchart illustrating a method of streaming video in real-time via a VR headset using a camera network, according to an embodiment of the invention. The method involves the following steps:

Receiving real-time video streams from a plurality of cameras from one or more live events (block 21);

Processing the received video stream by applying AI and computer vision algorithms to obtain a plurality of viewing angles of VR video streams for each specific event while separating between visual data and audible data of each viewing angle (block 22);

Streaming said processed videos streams according to each user's preferences and enables each user to switch between: different geographic locations, cameras, viewing angles, and streams of audible data (block 23); and Enabling a shared viewing experience (block 24). This optional block allows users to join a shared virtual space, where lifelike avatars represent each user. The avatars can be generated using various techniques, including real-time sensor data or 3D modeling. Users can interact with each other's avatars, engage in real-time communication, and experience AI-driven enhancements like virtual vendors or entertainers, all while watching the event together.

Figure 2B:
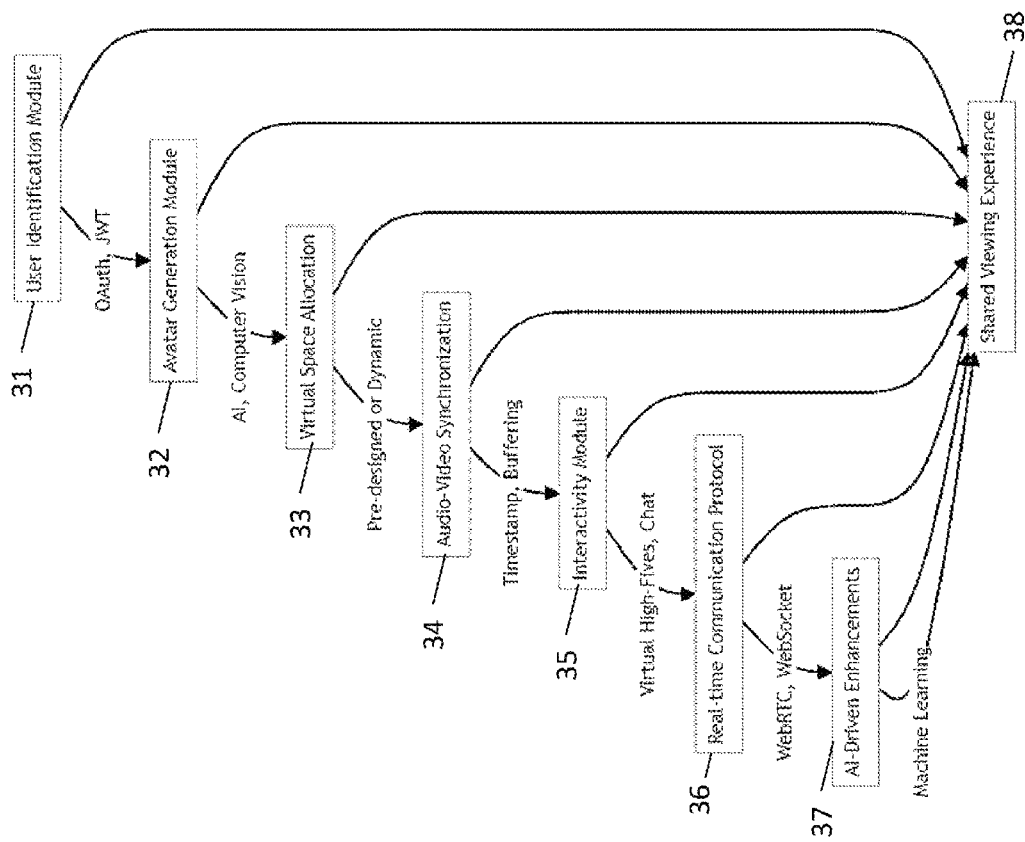
FIG. 2B schematically illustrates an architecture of shared viewing experience in virtual reality streaming, according to an embodiment of the invention.

FIG. 2B shows exemplary architecture of shared viewing experience in virtual reality streaming, according to an embodiment of the invention. The shared viewing experience aims to provide an enriched, social, and interactive event-viewing experience by enabling users to join a shared virtual space. Upon opting for the shared viewing experience, a User Identification Module 31 securely identifies each user, possibly using OAuth, JWT tokens, or other secure identification methods. Once identified, an Avatar Generation Module 32 creates a lifelike avatar for each user. This avatar can be generated based on real-time sensor data, 2D/3D modeling, or other techniques. Advanced AI models and computer vision algorithms are employed to ensure the avatars are as realistic as possible. These avatars are then placed in a shared virtual space allocated by a Virtual Space Allocation module 33. This space can either be a pre-designed 3D environment or dynamically generated based on the event being viewed. An Audio-Video Synchronization module 34 takes over next, ensuring that the video stream of the event is perfectly synchronized with the audio stream within this virtual space. For example, time-stamping and buffering techniques can be used to guarantee smooth playback.

For enhanced interactivity, an Interactivity Module 35 allows users to engage with each other's avatars. Features such as virtual "high-fives," text or voice chat, and sharing virtual objects like snacks or drinks can be included. Real-time communication between users is facilitated by a Real-time Communication Protocol 36, which could be based on WebRTC, WebSocket, or other similar technologies. Optionally, to further augment the experience, AI-Driven Enhancements 37 like virtual vendors or entertainers can be introduced into the space. These are controlled by machine learning algorithms that adapt to user behavior and preferences, thereby enriching the overall shared viewing experience 38.

The shared viewing experience not only enhances the streaming experience but also adds a social and interactive layer to it, allowing users to virtually attend events together in a more engaging manner.

According to some embodiment of the invention, the cameras are divided into groups. Each group of cameras is directed to stream videos of a specific event that may take place at a specific geographic location (e.g., a specific sports stadium) and to provide video streams from different angles. Accordingly, the system enables a user to switch between events that may occur simultaneously at different geographic locations (e.g., by receiving video streams from a different group of cameras).

It should be understood that the division of the method illustrated by the flowchart in FIG. 2 into separate operations, each represented by a block of the flowchart, has been selected for convenience and clarity only. Alternative division of the illustrated method into operations is possible with equivalent results. Such alternative division of the method into operations should be considered as included within the scope of embodiments of the present invention.

It should also be understood that, unless indicated otherwise, the illustrated order of operations as represented by blocks of the flowchart has been selected for the sake of convenience and clarity only. The order of execution of illustrated operations may be modified, or operations of the illustrated method may be executed concurrently, with equivalent results. Such adding and removing blocks or reordering of operations illustrated by blocks of the flowchart should be considered as included within the scope of embodiments of the present invention.

Figure 3A:
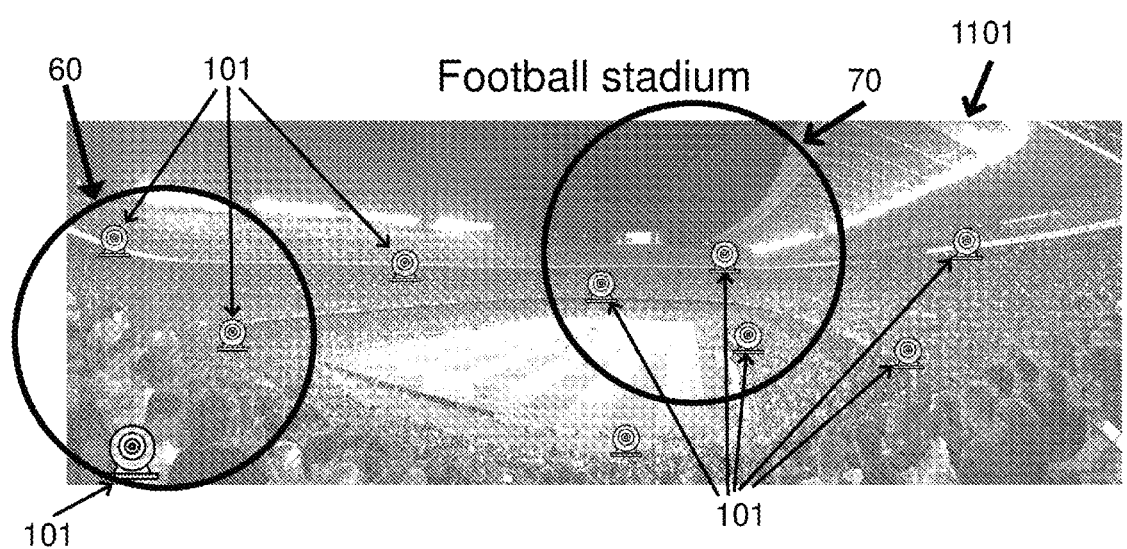
FIGS. 3A-3C schematically illustrate a plurality of VR cameras of the system of FIG. 1 for streaming video of live events that may coincide in different arenas (in real-time or near real-time) via a VR headset using the camera network, according to an embodiment of the invention.
Figure 3B:
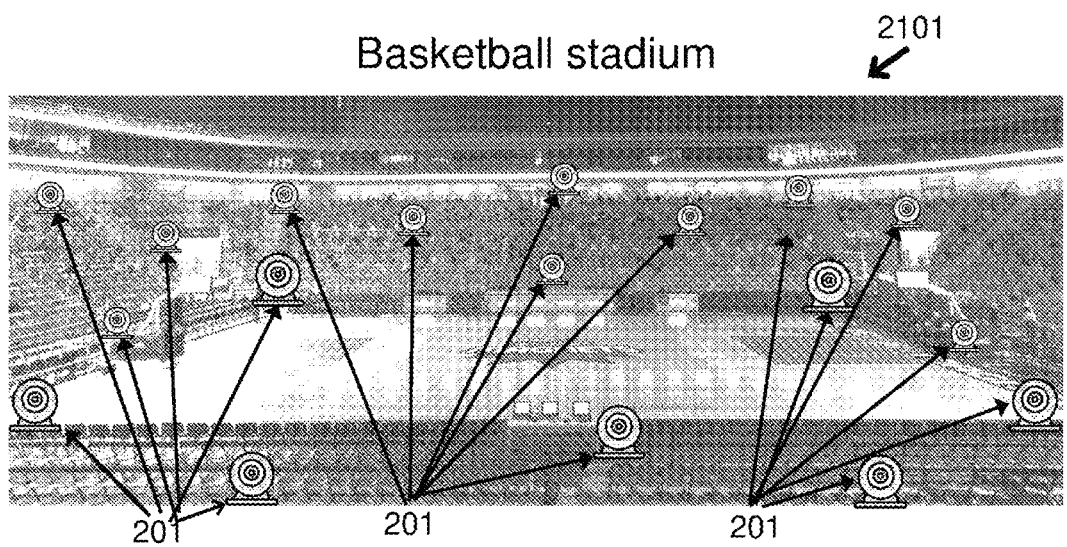
Figure 3C:
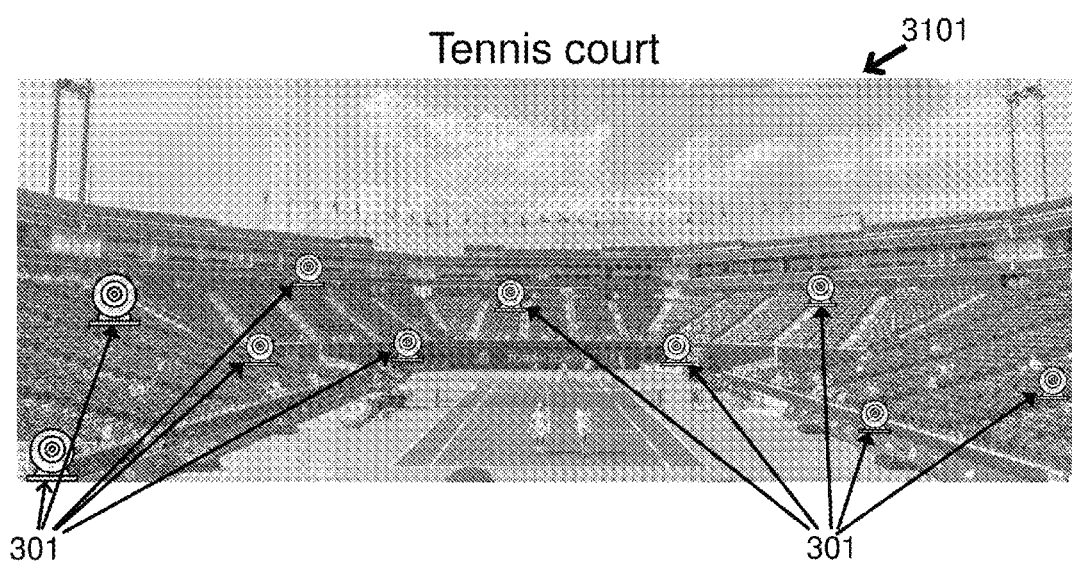

FIGS. 3A-3C schematically illustrate a plurality of VR cameras 2 of system 10 (of FIG. 1) for streaming video of live events that may coincide in different arenas (in real-time or near real-time) via a VR headset using a camera network, according to an embodiment of the invention. For example, one part of the group of VR cameras 2 is camera network 101 associated with a football stadium 1101 (FIG. 3A), which comprises a plurality of cameras suitable to capture together the "whole picture" of a live football game (including the entire stadium, game arena, audience, etc.). In this example, the system of the present invention allows real-time live streaming to translate a football game from any possible angles and positions, including leveraging any available and possible locations such as (the football field, seats, goal, any moving and nonmoving subjects, and objects in the stadium and utilize every possible means at hand) to place the cameras.

In the sense of clarity, FIG. 3B and FIG. 3C show two additional parts of the group of VR cameras 2. Camera network 201 is based on a basketball stadium 2101 (FIG. 3B), and camera network 301 is based on the Tennis court 3101 (FIG. 3C). Those camera networks are located based on the same concept as a camera network 101, but in different geographical locations and different live events.

The plurality of VR cameras 2 consists of all the camera networks that stream real-time videos from all the different geographic locations and live events (such as football games, basketball games, tennis matches, and all other kinds of games/matches or live events) all of them simultaneously stream real-time video and audio data to server 1 (of FIG. 1). Consequently server 1 receives real-time videos from all the camera networks located in different geographical arenas around the world. As a result, user 5 (FIG. 1) can virtually be in one moment in a football game with the ability to switch between the cameras on the particular event and enjoy watching the game from the different locations on the described event, and in another moment to teleport to another live event with an ability to go back to the previous event or to switch between the cameras network on the current event, or teleport to a different geographical location and to switch over and over between the different arenas and geographic locations and live events, as user 5 prefers with the ability to return to the previous geographical location or live event. User 5 can do it manually or use an automatic mode that may switch automatically based on the prediction of an upcoming development of an event of interest during the live event (by using AI and ML power).

The system of the present invention makes it possible for user 5 to control audio data regardless of the camera that streams video data. Server 1 receives real-time streaming, including the audio data from each camera, which is part of the plurality of VR cameras 2. Server 1 processes the received live streams of video and audio and made possible for user 5 to choose the audio from one camera while he watches the video from another camera. For example, as shown in FIG. 3A, fans in sector 60 are fans of the preferable user's football team, while fans in sector 70 are fans of the competitor team. Then user 5 can watch the game from any convenient angle (camera) for him while simultaneously listening to the audio (voices) from the area where the camera is placed near fans of sector 60 and feel as if he is a part of this group and can enjoy the game with his team fans while he watches the game from any angle of the stadium. This ability is not limited to one place, so user 5 can choose to listen to sound from one arena located in a first geographical location (e.g., the football stadium of FIG. 3A) while watching the live event from another arena located at a second geographical location (e.g., the basket stadium of FIG. 3B). For example: Imagine a user, John, attending a live football match virtually. While he chooses to view the game from a camera angle behind the goalpost, he prefers the audio commentary from a broadcaster who speaks his native language, Spanish. John can seamlessly switch to the Spanish commentary while retaining his chosen visual perspective. Additionally, he can hear the cheers and chants from the ultras fans seated near the midfield. As the game progresses, John's friend, Maria, who is also attending the game virtually, sends him an invite. John accepts, and they both start discussing the game in real-time, sharing their perspectives and reactions, all while continuing to enjoy their individual audio and visual preferences. This embodiment provides a multi-dimensional experience, making John and Maria feel as if they are truly present in the stadium, with the added advantage of personalized audio-visual controls.

Users can constantly change the geographical locations and live events, audio and video live streams independently from each other. For example, in FIG. 3A User can listen to sound from sector 60 in the football stadium 1101, while watching the live event in basketball stadium 2101 (FIG. 3B). With the possibility to switch between the cameras placed in different geographical locations and live events. In addition, user 5 can choose to watch the live event and listen to the broadcaster in the user's preferred language with the ability to switch between the languages.

Figure 4:
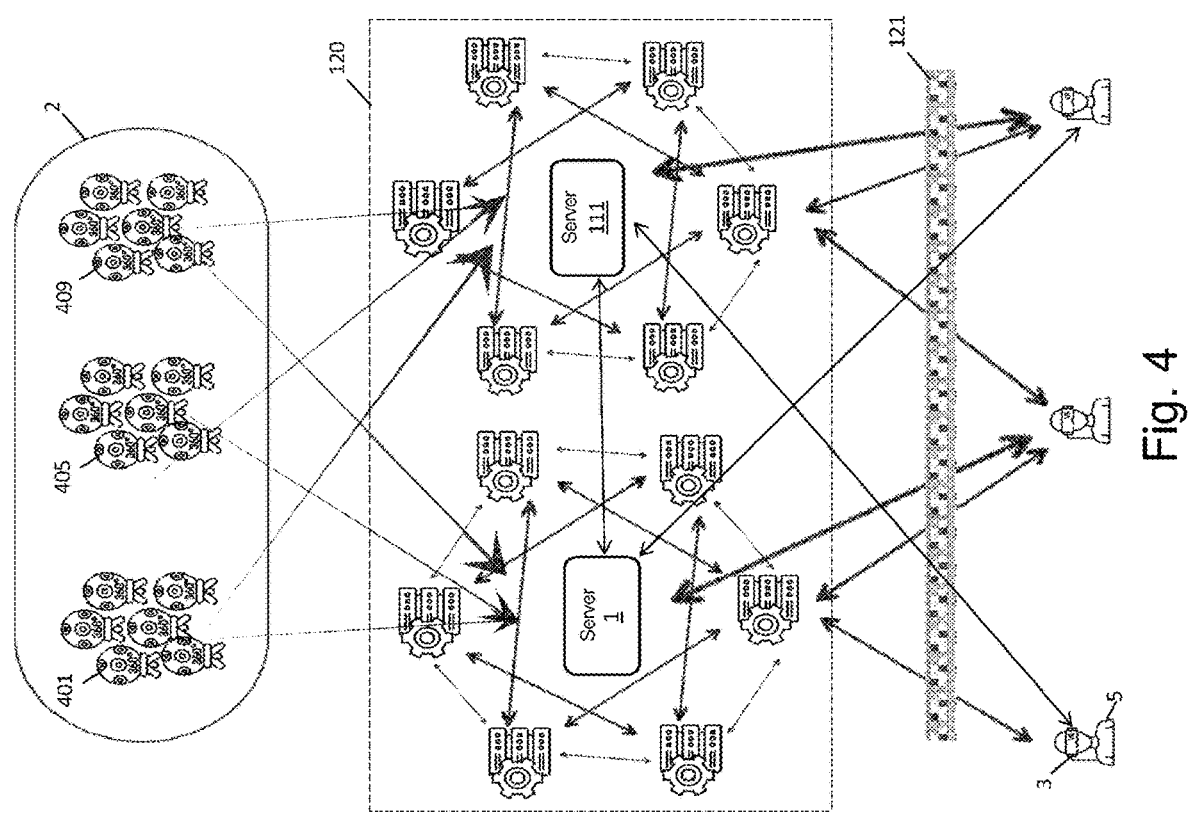
FIG. 4 schematically illustrates a plurality of VR cameras grouped based on their geographic location and live events, where each group of cameras adapted to stream video from a different live event, according to an embodiment of the invention.

In FIG. 4, a plurality of VR cameras (2) are grouped based on their geographic location and live events, where each group of cameras streams video from a different live event. For instance, cameras in Group 401 could be located in the UK at a football stadium, Group 405 in the USA at a basketball stadium in New York, and Group 409 in Spain at a tennis court. All worldwide available cameras placed in different geographic locations may stream data simultaneously to one or more servers (a network of server is generally indicated by the dotted line with numeral 120), where, for example, Server 1 and Server 111 ensure quality system work. If one of the servers malfunctions, one or more other servers could ensure uninterrupted broadcasting to a VR equipment (3) of an end user (5).

According to an embodiment of the invention, AI and machine learning technologies are utilized in internal processes for data transfer to a wide range of users with synchronized high-quality video and audio streams. Users can virtually travel between and within live events worldwide using a plurality of VR cameras (2) in manual or automatic mode. A unique application adjusted for different kinds of devices allows the user to pick as many events as they prefer and set all necessary settings.

According to an embodiment of the invention, regional servers or CDN (Content Delivery Network) are included in the delivery system to nullify latency. This increases delivery time and quality, reduces or eliminates buffering, and ensures that the user receives live streaming even if one of the servers or CDNs fails. The system also includes software or hardware firewalls and other high-level system protection options to enhance security against hackers.

According to an embodiment of the invention, in order to prevent cyber-attacks, control outgoing traffic, and prioritize incoming traffic to ensure a smooth streaming experience for viewers, the system comprises security tool(s) for servers 120 such as a firewall 121, or any other security solutions suitable for video streaming.

Figure 5:
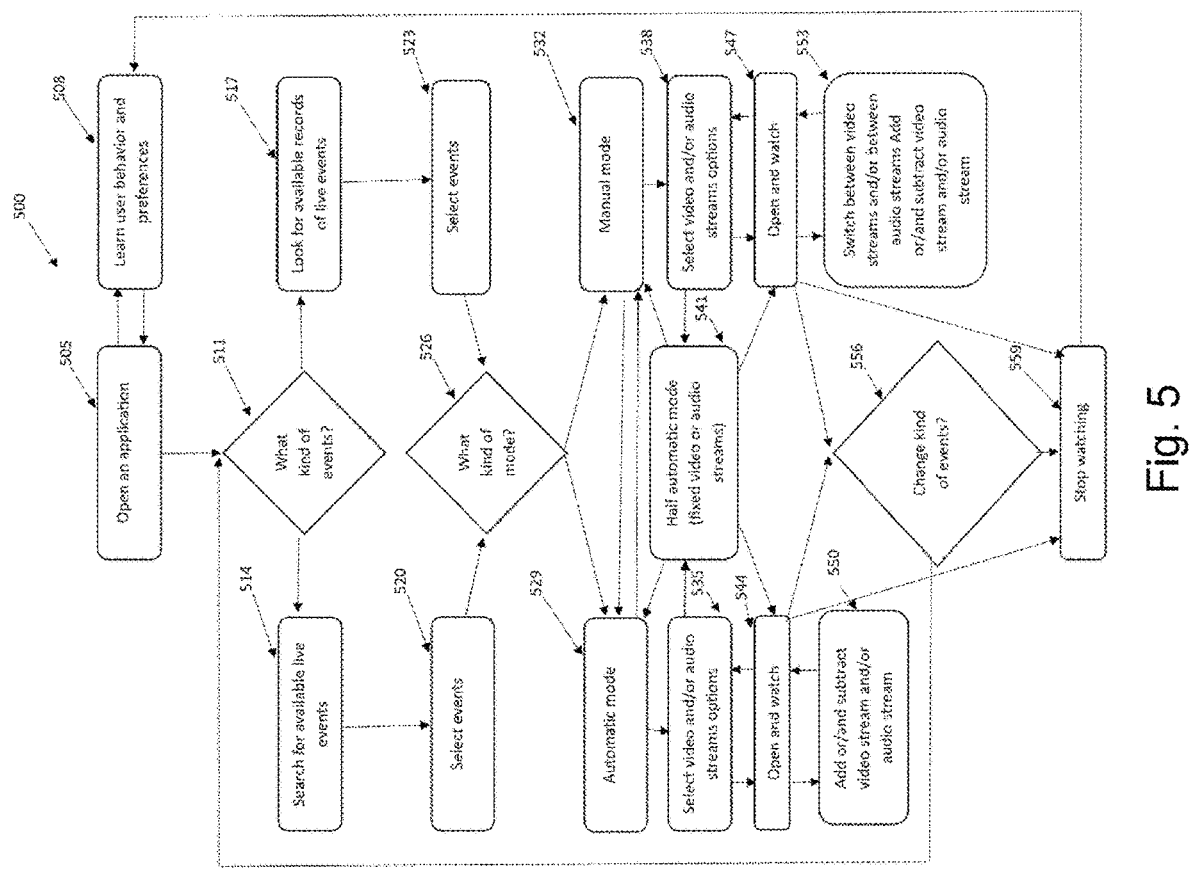
FIG. 5 is a flowchart that illustrates the work process of a versatile application, designed to interact with a range of devices such as VR headsets, mobile phones, tablets, and TV to facilitate live event streaming, according to an embodiment of the invention.

Unless stated otherwise, it is important to note that the sequence of operations shown in the flowchart as represented by blocks in FIG. 4 has been arranged for the sake of convenience and clarity only. New blocks can be added or existing blocks can be removed. The order of executing the depicted operations may be altered or certain operations may be carried out simultaneously, producing equivalent outcomes. It should be understood that rearranging the sequence of operations illustrated by blocks in the flowchart is encompassed within the scope of the present invention FIG. 5 is a flowchart 500 that illustrates the work process of a versatile application 505, designed to interact with a range of devices such as VR headsets, mobile phones, tablets, TV, etc. to facilitate live event streaming, according to an embodiment of the invention.

The flowchart begins with block 508, where the system implements advanced technologies such as AI and machine learning to learn user behavior and preferences. When users open the application, they can search for events in blocks 523 or 526. The system tracks the user's activity and learns their preferences during this process. For example, suppose the user chooses football events in the UK and basketball events in New York. In that case, the system will show similar events the next time the user opens the application, constantly improving the user experience.

In block 511, the user decides which type of event to choose, either available live events in block 514 or recorded events in block 517. After selecting the type of event, the user may see a list of different events, such as basketball, tennis, football, and hockey, in blocks 520 or 523. Users can then use filters to refine their search by selecting countries, cities, teams, game start times, and other options. In these blocks, the user can select multiple events to travel between them, switching between video and audio streams from different geographic locations, cameras, viewing angles, and more.

In block 526, the user chooses the mode they want to use, either automatic mode (block 529) or manual mode (block 532). If the user chooses automatic mode, they can customize settings in block 535, such as preferences for specific game moments or audio streams, broadcaster language, and more. For example, if the user chooses the automatic mode, they can select settings in block 535. These settings might include user preferences for specific game moments such as when a penalty occurs in a football game, when a player hits the puck towards the goal in hockey, etc. In manual mode (block 532), the user can select video and/or audio streams options (block 538) and may manually switch between video and audio streams (e.g., by using any suitable device or available method). Block 538 emphasizes the system's capability to provide a personalized experience. Based on the user's behavior during the live stream, the system learns and refines its predictions and suggestions for future streams. For example, if a user frequently switches to a particular camera angle during football matches, the system will prioritize that angle in future matches.

According to an embodiment of the invention, once the user has made their selection, the system begins streaming the chosen event(s) to the user's device. The system ensures high-quality streaming by utilizing regional servers or CDNs, as mentioned earlier, to minimize latency and provide a seamless viewing experience. During the streaming process, as illustrated in block 532, users have the option to interact with the system. They can switch between different camera angles, change the audio source (e.g., switch between commentators and/or listen to the crowd and/or engage in real-time conversations with friends or other users while enjoying the event), adjust the volume, or even jump between different live events. This interactivity is facilitated by the system advanced AI modules, which can predict and suggest camera angles or events the user might be interested in.

In one embodiment of the invention, a multi-dimensional auditory experience is provided. For example, the system may incorporate an audio stream selector (not shown), allowing users to choose from various audio streams originating from different sources such as cameras, broadcasters, or other users. An integrated audio mixer (not shown) combines these selected streams, adjusting properties like volume and balance based on user preferences. A language switcher is also available, enabling users to change the broadcaster's language in real-time. To facilitate seamless communication between users, a real-time communication protocol, leveraging technologies like WebRTC or WebSocket, is employed. This ensures a two-way audio channel for user interactions. An audio-video Synchronizer (not shown) is implemented to guarantee that the mixed audio streams are perfectly aligned with the video stream. The system also features a user-friendly interface for easy selection and adjustment of audio streams. The final mixed and synchronized audio is outputted through the user's audio device, offering a customizable, multi-dimensional auditory experience. This architecture allows for real-time adjustments, enabling users to fine-tune their auditory settings during a live event, thereby enriching the overall user experience.

For users who are interested in statistics or additional information about the event, e.g., block 535 may further allow for real-time data overlays. For instance, during a football match, users might see real-time statistics about ball possession, player performance, or even social media reactions.

In block 541, the user can select the half-automatic mode to fix either audio or video streams. For example, the user can set a fixed preferable audio stream while switching between video streams remains automatic or vice versa. After setting the necessary preferences, the user can start watching translations in block 544 or block 547, depending on their mode selection.

If the user changes their mind about the selected mode, they can switch between manual, half-automatic, and automatic modes. If the user switches between automatic and half-automatic modes, they can add or remove video and audio streams in block 550. If the user switches between manual and half-automatic modes, they can switch between video and audio streams, or depend on fixed streaming, in block 553.

The user can stop their multi-events journey at any point in block 559 or return to the beginning (block 511) and choose other options, such as real-time event streaming or available records, in block 556.

Overall, this flowchart shows the intricate process of application 505, which integrates advanced technologies to offer users a personalized and flexible live event streaming experience comprising a plurality of live events simultaneously.

Unless stated otherwise, it is important to note that the sequence of operations shown in the flowchart as represented by blocks in FIG. 5 has been arranged for the sake of convenience and clarity only. Blocks can be added, or removed from the flowchart. The order of executing the depicted operations may be altered or certain operations may be carried out simultaneously, producing equivalent outcomes. It should be understood that rearranging the sequence of operations illustrated by blocks in the flowchart is encompassed within the scope of the present invention.

The AI modules integrated into the system play a pivotal role in enhancing the user experience, especially when it comes to jumping between multiple events. These modules analyze vast amounts of data in real-time to make predictions and suggestions. For instance, if two significant football matches are happening simultaneously, and a crucial moment (like a penalty kick) is about to occur in one of them, the AI can suggest or automatically switch the user to that event, ensuring they don't miss out on any thrilling moments. This "event jumping" capability, powered by AI, sets the system apart, offering users a dynamic and immersive viewing experience that traditional broadcasting methods can't match.

According to an embodiment of the invention, the system may comprise the following components (as shown with respect to FIG. 1):

1. AI Modules (14):
   The AI modules are at the heart of the system, designed to perform real-time analysis of streaming data from multiple events.
   These modules harness the power of machine learning, deep learning, and neural networks. Their primary function is to identify or predict moments of interest in each event, ensuring that viewers don't miss out on any significant occurrences.
   Over time, the AI modules can learn and adapt to a user's viewing preferences for multiple events. This adaptive learning ensures that the system can autonomously adjust the streaming angle based on these preferences, offering a personalized viewing experience.
2. Computer Vision Algorithms (15):
   Working in tandem with the AI modules, the computer vision algorithms differentiate and prioritize moments from diverse events.

These algorithms analyze visual data, detect patterns, and make decisions based on the content. For instance, they can recognize a goal-scoring opportunity in a soccer match or the birth of an animal in a zoo.

The algorithms also play a crucial role in selecting the optimal camera angle for each moment, ensuring that viewers get the best possible perspective.

3. Network of Cameras (2):

The system integrates a network of cameras positioned at various events. These cameras capture diverse viewing perspectives, adding depth and breadth to the streaming experience.

Each camera in the network is equipped with sensors and communication modules that relay data back to the central system in real-time.

The AI modules and computer vision algorithms analyze the data from these cameras to select the best viewing angles for each moment.

Method of Operation:

1. Streaming Data Analysis:

As events unfold, the system continuously analyzes streaming data from the network of cameras.

The AI modules and computer vision algorithms work in harmony to differentiate and predict moments of interest in each event.

2. Audio-Video Splitting:

A unique feature of the system is its ability to split the audio from one event's streaming source and synchronize it with the video from another event.

This allows users to visually engage in one live event while audibly immersing in a different live event, offering a customizable multi-event viewing and listening experience.

The user has the unique ability to select not only one audio stream from any camera, including those on the network, but also to add a broadcaster with their preferred languages.

Additionally, users can engage in real-time conversations, allowing them to talk to friends or other users while enjoying the event, further enhancing the interactive experience.

3. User Preference Adaptation:

The system constantly learns from user interactions. As users select their preferred viewing angles or switch between events, the AI modules adapt and refine their predictions.

Over time, this results in a more tailored and engaging streaming experience, where the system can anticipate user preferences and make real-time adjustments.

4. Autonomous Angle Adjustment:

Based on the analysis and user preferences, the system autonomously adjusts the streaming angle. Whether it's a close-up of a soccer player about to score or a wide-angle view of an animal habitat, the system ensures that viewers get the best perspective.

In conclusion, the present invention revolutionizes the multi-event streaming experience by harnessing the power of AI, computer vision, and a network of cameras. It offers viewers a unique, personalized, and immersive experience, ensuring they never miss out on any moment of interest.

The following are examples for possible AI modules 14, computer vision algorithms 15 and network of cameras 2:

1. AI Modules:

Deep Neural Networks (DNNs): These are multi-layered neural networks that can model complex patterns and structures in data. For instance, Convolutional Neural Networks (CNNs) can be used for image and video analysis, making them ideal for analyzing streaming data from sports events.

Recurrent Neural Networks (RNNs): Especially useful for sequential data, RNNs can be employed to analyze patterns over time, such as the progression of a live concert or a theater performance.

Reinforcement Learning: This technique allows the system to learn optimal strategies by rewarding positive outcomes. For instance, if a user frequently switches to a particular camera angle, the system rewards this choice, refining its future predictions.

2. Computer Vision Algorithms:

Object Detection (e.g., YOLO, SSD): These algorithms can detect and classify objects in images and videos. For instance, in a soccer match, they can recognize the ball, players, and goalposts.

Motion Analysis (e.g., Optical Flow): This helps in tracking the movement of objects, which can be crucial for events like races or any fast-paced sports.

Scene Recognition (e.g., Places-CNN): This can be used to identify the type of event, whether it's a serene nature documentary or an intense basketball game.

3. Network of Cameras:

Pan-Tilt-Zoom (PTZ) Cameras: These cameras can change their orientation and focus, allowing for dynamic coverage of events.

360-Degree Cameras: Offering a panoramic view, these cameras can capture an entire scene, providing viewers with a comprehensive perspective.

Infrared Cameras: For events happening in low-light conditions, like nocturnal wildlife observations, these cameras can capture clear footage.

The following are examples for the method of operation:

1. Streaming Data Analysis:

As a soccer match progresses, the DNNs analyze the video feed, detecting significant moments like goal attempts or fouls.

For a concert, RNNs can track the sequence of songs and anticipate crowd reactions, adjusting the streaming angle for optimal viewer engagement.

2. Audio-Video Splitting:

A viewer watching a serene nature documentary can choose to listen to the commentary of a live soccer match. The system uses audio processing algorithms to synchronize the video of the documentary with the audio of the match, ensuring no lag or mismatch.

3. User Preference Adaptation:

If a user frequently zooms in on the lead guitarist during a concert, the system recognizes this preference. The next time the user watches a similar event, the system might suggest or automatically switch to a close-up of the guitarist.

4. Autonomous Angle Adjustment:

During a wildlife documentary, if a lion starts chasing a gazelle, the Optical Flow algorithm detects this rapid movement. The system then autonomously switches to a PTZ camera that follows the chase, offering viewers a thrilling perspective.

Integration with Virtual Reality (VR) for Shared Viewing Experience

According to an embodiment of the invention, the present invention further extends its capabilities by integrating with Virtual Reality (VR) technology to offer a shared viewing experience. This embodiment aims to create a more immersive and interactive environment for users, allowing them to not only watch events but also share the experience with others in a virtual space.

Figure 6:
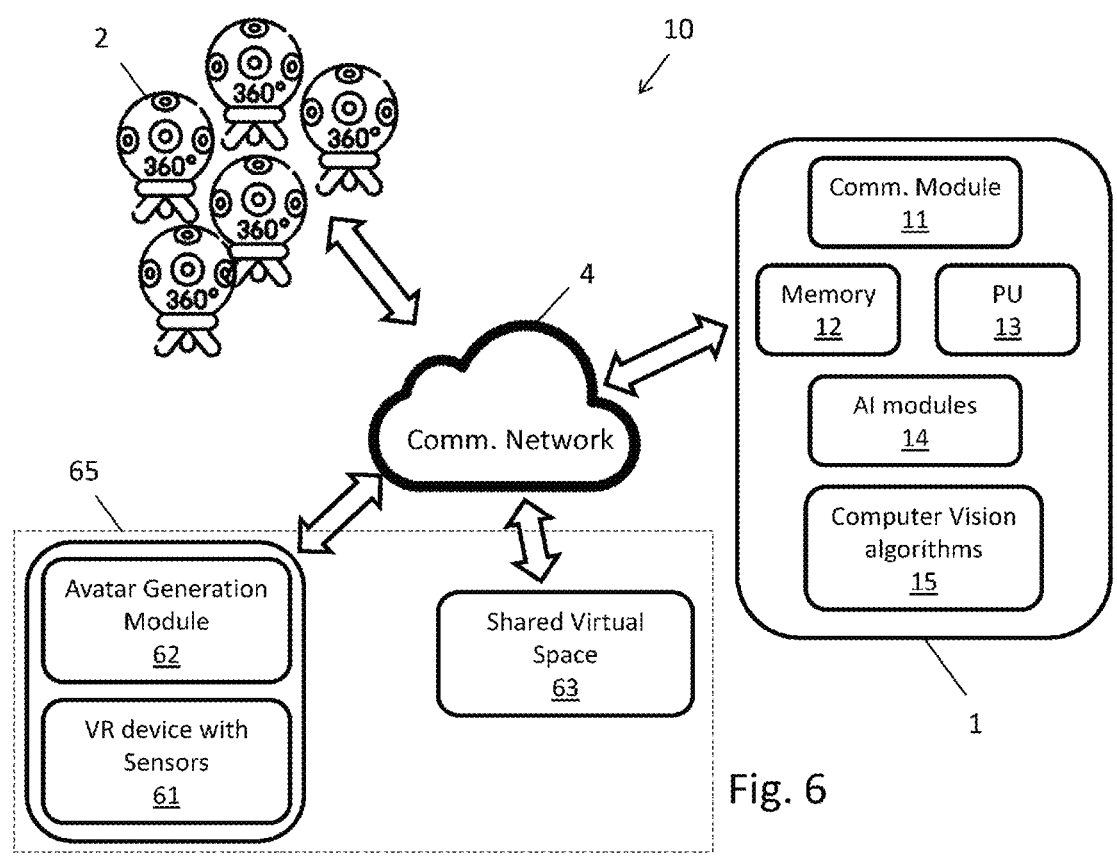
FIG. 6 schematically illustrates the system of FIG. 1 provided with VR for Shared Viewing Experience, according to an embodiment of the invention.

FIG. 6 schematically illustrates system 10 provided with VR for Shared Viewing Experience system 65, according to an embodiment of the invention. According to an embodiment of the invention, the system's integration with VR for Shared Viewing Experience system 65 may comprise the following components (in addition to the components described hereinabove and shown with respect to FIG. 1):

1. VR Device with Sensors 61: The system employs a VR device equipped with advanced sensors. These sensors are designed to capture facial features, body movements, and even objects that a user might be holding, such as a beverage or a snack.
2. Avatar Generation Module (AGM) 62: The AGM is a sophisticated software component that processes the data captured by the VR device's sensors. It uses this data to generate a real-time 3D avatar of the user. Advanced deep learning models within the AGM ensure that the avatar closely resembles the user, capturing facial features, clothing, and even the user's current actions, like drinking from a cup.
3. Shared Virtual Space 63: This is a virtual environment where multiple avatars, representing different users, can gather, interact, and share experiences. The space can be rendered to represent real-world venues, such as stadiums, concert halls, or theaters, enhancing the realism of the viewing experience.

According to an embodiment of the invention, the method of operation may involve the following procedure:

1. Data Capture: When a user wears the VR device, the integrated sensors immediately begin capturing data. This includes facial features, body movements, and any objects the user might be holding.
2. Avatar Generation: The captured data is sent to the Avatar Generation Module, which processes the information and creates a detailed 3D avatar of the user. Advanced AI algorithms ensure that the avatar is a close representation of the user, incorporating real-time actions and movements.
3. Joining the Shared Space: Once the avatar is generated, it is placed in the shared virtual space. Here, the user can interact with other avatars, representing friends or other viewers. They can choose their vantage points, move around, and even communicate with others.
4. Synchronous Reactions: As events unfold in the real world, the avatars in the virtual space can have synchronous reactions. For instance, during a climactic moment in a soccer match, all avatars might simultaneously jump in excitement, mirroring the actions of the users they represent.
5. AI-Driven Enhancements: The system continually uses AI to enhance the shared viewing experience. This includes optimizing avatar movements for realism, suggesting interactive activities within the virtual space, and even introducing AI-driven virtual entities to engage with users.

This embodiment of the invention revolutionizes the way users experience live events. By combining the immersion of VR with the interactivity of a shared virtual space, users can enjoy events with friends and family, regardless of physical distance. The AI-driven components ensure that the experience is not only realistic but also tailored to each user's preferences, making it a truly personalized and shared viewing experience.

According to an embodiment of the invention, by leveraging the system's AI modules and computer vision algorithms, it offers users an immersive shared viewing experience. This is achieved by generating avatars of users based on real-time sensor data, allowing friends or other invited users to virtually "watch" events together. Additionally, users can communicate with each other either verbally or via chat. For instance, while watching a live concert, one user might verbally comment on the performance, while another might send a chat message sharing a related article about the artist. They can also participate in each other's viewing sessions, allowing for a collaborative and interactive watching experience.

The following is an example of possible system components for VR integration for shared viewing experience:

1. VR Device with Sensors:
    Facial Recognition Sensors: These sensors capture the facial features of the user in real-time. Using deep learning models like FaceNet or VGG-Face, the system can recreate a detailed and accurate facial avatar of the user.
    Full-Body Scanners: Using infrared or depth sensors, the system can map the entire body of the user, capturing details like clothing, posture, and movement.
    Object Recognition Sensors: These sensors can identify objects the user might be holding, such as a drink, popcorn, or a remote. Algorithms like R-CNN or Fast R-CNN can be employed for this purpose.
2. Avatar Generation Module:
    This module processes the data from the VR device sensors to generate a real-time 3D avatar of the user. Advanced graphics rendering techniques, combined with AI-driven texture mapping, ensure the avatar closely resembles the actual user.
3. Shared Virtual Space:
    This is a virtual environment where users' avatars can gather. It can be a virtual stadium, concert hall, or any other event venue. The space is rendered in 3D, and users can choose their vantage points, much like selecting seats in a real venue.

Method of Operation with VR Integration:

1. User Onboarding:
    When a user first puts on the VR device, the system prompts a quick scanning process. The facial recognition sensors capture the user's face, while the full-body scanners map the rest of the user.
    If the user is holding any objects, like a drink or a snack, the object recognition sensors identify these, and they are added to the avatar.
2. Avatar Generation:
    The Avatar Generation Module processes the sensor data in real-time. Using advanced AI models and graphics rendering techniques, it creates a lifelike avatar of the user. This avatar is then placed in the shared virtual space.
3. Shared Viewing Experience:
    Invited friends or users, also equipped with similar VR devices, join the shared virtual space. Their avatars, generated using the same process, appear in the space.
    All users can then watch the event together, with their avatars mimicking their real-world movements and actions. For instance, if a user stands up to cheer during a soccer goal, their avatar does the same in the virtual space.

4. Interactivity and Engagement:
Users can interact with each other's avatars, offering a social viewing experience. They can "high-five" during exciting moments or even share virtual snacks.

The system can also introduce AI-driven virtual vendors or entertainers in the space, enhancing the overall experience.

Incorporating this embodiment, the invention not only provides an enhanced streaming experience but also bridges the gap between virtual and physical worlds, offering users a social and interactive event-viewing platform. The flexibility of the invention ensures that it's not confined to just using sensors; other innovative techniques can also be utilized to capture and create the immersive experience.

As will be appreciated by the skilled person, the arrangement described in the figures results in a system that is capable of providing a VR camera network that performs live streaming via a VR headset that gives users an enriching experience like being present in the event. Moreover, the system of the present invention may provide each user with a personalized experience tailored to the user's preferences or watching habits. The system of the present invention provides the users with the ability to choose where they want to be at each moment during a specific event or other events.

The terms "for example" and "e.g.", as used herein, are intended to be used to introduce non-limiting examples. While certain references are made to certain example system components or services, other components and services can be used as well and/or the example components can be combined into fewer components and/or divided into further components.

All the above descriptions and examples have been given for the purpose of illustration and are not intended to limit the invention in any way. Many different algorithms, methods of applying VR streaming, and electronic and logical elements can be employed, all without exceeding the scope of the invention.

The invention claimed is:

1. A method of streaming video in real-time via virtual reality (VR) headset using a camera network, comprising:
   receiving real-time audio and visual streams from a plurality of cameras positioned at distinct live events occurring simultaneously;
   applying artificial intelligence (AI) and computer vision algorithms configured to differentiate and synchronize the received audio and visual data streams from the distinct live events;
   employing a machine learning model to predict and pre-emptively select optimal viewing angles and corresponding audio streams based on a combination of event dynamics, user preference, and historical data trends, which are not predetermined or static recommendations; and
   streaming the synchronized audio and visual data streams according to each user's preferences and, enabling each user to switch between cameras, viewing angles, and audio streams.

2. The method according to claim 1, wherein the AI algorithms are configured to recognize and interpret significant visual cues from each distinct live event for real-time stream selection.

3. The method according to claim 1, wherein applying the AI and computer vision algorithms are configured to analyze the streaming data to predict situations/actions of interest that are about to be developed/occurred during the live event.

4. The method according to claim 1, wherein applying the AI and computer vision algorithms are configured to automatically change the viewing angle streamed to the VR headset according to the predicted situation, and determine from which camera said situation could be best viewed.

5. The method according to claim 1, wherein the AI and computer vision algorithms are configured to learn individual user viewing preferences and accordingly suggest optimal viewing angle, or automatically switch to said suggested viewing angle.

6. The method according to claim 1, further comprising enabling users to manually switch between cameras located at the same or different geographic locations, wherein each geographic location is associated with a different event.

7. The method according to claim 1, further comprising analyzing audio streams to identify key auditory events indicative of high engagement moments within the live events, thereby facilitating optimized audio stream selection.

8. The method of claim 1, wherein the AI algorithms are configured to analyze commentary and crowd noise to enhance the selection of audio streams correlating to user-preferred moments.

9. The method of claim 1, further comprising providing a user interface within the VR environment enabling users to provide real-time feedback, which is utilized by the machine learning model to refine future predictions of optimal viewing angles and corresponding audio streams.

10. The method of claim 1, wherein the synchronized audio and visual data streams are adapted to be streamed to a range of devices including VR headsets, mobile phones, PCs, tablets, and TVs.

11. A system for streaming video in real-time via virtual reality (VR) headset from one or more live events simultaneously, comprising:
    a network of cameras positioned at distinct geographic locations capturing audio and visual data streams of respective live events;
    a processing unit comprising artificial intelligence (AI) and computer vision algorithms configured to differentiate, analyze, and synchronize audio and visual data streams from the distinct live events;
    a machine learning module configured to dynamically select and preemptively adjust optimal viewing angles and corresponding audio streams based on event dynamics, individual user preference, and historical viewer interactions; and
    a streaming server configured to transmit the synchronized audio and visual data streams to the VR headset, enabling seamless user-directed or automated switching between cameras, viewing angles, and audio streams, delivering adaptive, real-time experience distinct from pre-scripted audio-visual content.

12. A system according to claim 11, wherein at least some of the cameras are adapted to be carried by moveable objects, including selected persons and portable equipment, enhancing real-time immersive viewing experiences.

13. The system of claim 11, further comprising a user interface module integrated within the VR environment for collecting user feedback, which the machine learning module utilizes said feedback to refine the predictions and selections of viewing angles and audio streams.

* * * * *